United States Patent Office 2,794,802
Patented June 4, 1957

2,794,802

SYNTHESIS OF PINAKRYPTOL YELLOW

Lester Horwitz, Binghamton, N. Y., assignor to General Aniline & Film Corporation, New York, N. Y., a corporation of Delaware No Drawing. Application June 4, 1954, Serial No. 434,649

5 Claims. (Cl. 260—240)

The present invention relates to an improved method of producting pinakryptol yellow while ensuring high yields of a relatively pure product.

It is known that the sensitivity of silver halides to light can be reduced without impairing the developability of the latent image by application, after exposure and before development, of a substance known as a desensitizer. The employment of a desensitizer, for instance, makes it possible to develop even high speed panchromatic emulsions in fairly bright light without danger of fog.

One of the most important desensitizers is the product known as pinakryptol yellow which has the following constitution:

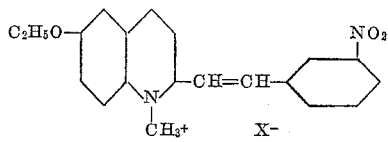

X=an acid radical.

This product is usually prepared according to the methods of German Patents 396,402 and 468,093 which involve, broadly, the condensation of a 1-methyl-6-ethoxy-quinaldinium salt such as the methosulfate with m-nitro-benzaldehyde in the presence of a strong organic base such as piperidine as an acid binding agent. The difficulty with the procedures of the German patents resides in the fact that such procedures lead to a relatively low yield of a fairly crude compound. Efforts have been made to improve the process with a view toward enlarging the yield but it has been found, even after exhausted studies, that the best the process of the German patents can do is a yield of from 20–30% of theory.

It is believed evident that the intermediates used are relatively expensive. Pinakryptol yellow is employed rather widely in the photographic industry. In these circumstances, it is manifest that there is a sore need for a process of producing this compound in high yields and in a pure state.

It has been discovered that the compound of the German patents can be obtained from the reactant used by the German patentees in quantitative yields in a state of nearly analytical purity by rigidly controlling the heating conditions so that a temperature of about 80° C. is obtained in a few minutes after the reactants have been brought together.

The preparation of pinakryptol yellow, while observing such heating conditions, constitutes the purposes and objects of the present invention.

As previously noted, the reactants employed are a 1-methyl-6-ethoxy-quinaldinium salt, such as the methosulfate, methiodide, methyl-p-toluenesulfonate and the like, on the one hand, and m-nitrobenzaldehyde, on the other hand. The reactants are used in equimolar quantities, but a slight excess of the aldehyde is preferred. The acid liberated during the condensation is bound by the use of a strong base, preferably piperidine dissolved in a solvent such as isopropyl alcohol.

The condensation is effected by mixing the reactants and bringing the reactants to a temperature of about 80° C. in a period of 2–3 minutes. The reaction is preferably conducted by refluxing although other types of heating may be used if desired, as long as the reaction temperature is reached in the prescribed period of time. After heating to the reaction temperature has been effected, refluxing is continued until reaction has gone to completion.

The product may be worked up by cooling the reaction mixture, filtering, washing the isolated solid with a solvent, such as methanol, and drying.

The following example will serve to illustrate the invention, but it is to be understood that the invention is not restricted thereto. All parts are by weight unless otherwise stated.

*Example*

A mixture of 18.3 parts of 1-methyl-6-ethoxy-quinaldine-methosulfate, 9.1 parts of m-nitrobenzaldehyde, 1 part by volume of piperidine in 100 parts by volume of isopropyl alcohol is brought to reflux temperature in 2–3 minutes. Refluxing is then continued until reaction has gone to completion which will be in about 40 minutes. The reaction mixture is then cooled and the product collected by filtration. After washing with methanol and drying, there is obtained 25 parts of pinakryptol yellow (92–97% yield) having a melting point of 267° C. (M. P. of analytical sample 266–268° C.).

It is to be emphasized that the critical factor of the process is the elevation of the reactants to the reaction temperature in the designated short period of time. It has been established that variations from this procedure produce poor yields, i. e., as low as 20–30% and in extreme cases no condensation at all takes place.

Modifications of the invention will occur to persons skilled in the art. For instance, in lieu of the piperidine, one may use other strong organic bases, such as trimethylamine and the like. Similarly, other quinaldinium salts, such as indicated above, may be employed in lieu of the methosulfate. I, therefore, do not intend to be limited in the patent granted except as necessitated by the appended claims.

I claim:

1. The process of producing pinakryptol yellow in high yields and in a state of high purity which comprises admixing equimolar quantities of a 1-methyl-6-ethoxy-quinaldinium salt and m-nitro-benzaldehyde, adding a solvent and an acid binding agent and bringing the reactants from room temperature to a temperature of about 80° C. in a period of a few minutes, and continuing the heating at this temperature until the reaction goes to completion.

2. The process as defined in claim 1, wherein the acid binding agent is piperidine.

3. The process as defined in claim 1, wherein the reactants are refluxed at about 80° C.

4. The process as defined in claim 1, wherein the quinaldinium salt is 1-methyl-6-ethoxy-quinaldinium methosulfate.

5. The process as defined in claim 1 wherein the solvent is isopropyl alcohol.

References Cited in the file of this patent

UNITED STATES PATENTS

| 1,653,314 | Schuloff | Dec. 20, 1927 |
| 1,994,170 | Dabelow et al. | Mar. 12, 1935 |

OTHER REFERENCES

Atabekova et al.: Chem. Abstr., vol. 29, Col. 2537–2538 (1935).